(12) United States Patent
Pitcher

(10) Patent No.: US 11,656,203 B2
(45) Date of Patent: May 23, 2023

(54) APPARATUS AND METHOD FOR DETERMINING SOLIDS LEVEL IN A SAND SEPARATOR

(71) Applicant: North American Automation, LLC, Spring, TX (US)

(72) Inventor: Jason Pitcher, Spring, TX (US)

(73) Assignee: Batfer Investment S.A., Montevideo (UY)

(*) Notice: Subject to any disclaimer, the term of this patent is extended or adjusted under 35 U.S.C. 154(b) by 0 days.

(21) Appl. No.: 17/544,323

(22) Filed: Dec. 7, 2021

(65) Prior Publication Data

US 2022/0184532 A1 Jun. 16, 2022

Related U.S. Application Data

(60) Provisional application No. 63/123,811, filed on Dec. 10, 2020.

(51) Int. Cl.
| | | |
|---|---|---|
| *G01N 29/14* | (2006.01) | |
| *B01D 21/30* | (2006.01) | |
| *G01N 29/036* | (2006.01) | |
| *B01D 21/34* | (2006.01) | |
| *G01F 11/28* | (2006.01) | |

(Continued)

(52) U.S. Cl.
CPC ............ *G01N 29/14* (2013.01); *B01D 21/302* (2013.01); *B01D 21/34* (2013.01); *G01F 11/282* (2013.01); *G01N 29/036* (2013.01); *G01F 11/34* (2013.01); *G01F 11/40* (2013.01); *G01F 11/46* (2013.01); *G01N 2291/02408* (2013.01); *G01N 2291/02416* (2013.01); *G01N 2291/02458* (2013.01)

(58) Field of Classification Search
CPC ......... G01N 29/14; G01N 2291/02408; G01N 29/036; G01N 2291/02416; G01N 2291/02458; G01F 11/282; G01F 11/34; G01F 11/40; G01F 11/46; B01D 21/302; B01D 21/34
USPC .......................................................... 73/579
See application file for complete search history.

(56) References Cited

U.S. PATENT DOCUMENTS

| | | | |
|---|---|---|---|
| 6,790,367 B2 | 9/2004 | Schmigel et al. | |
| 9,616,431 B2 | 4/2017 | Lyon et al. | |

(Continued)

FOREIGN PATENT DOCUMENTS

| | | | | |
|---|---|---|---|---|
| CN | 100405027 C | * | 7/2008 | ............ G01N 29/14 |
| CN | 108398488 A | * | 8/2018 | ............ G01N 29/14 |

(Continued)

OTHER PUBLICATIONS

Wikipedia—Audio Frequency definition, 2 pages (Year: 2022).*

*Primary Examiner* — Lisa M Caputo
*Assistant Examiner* — Rose M Miller
(74) *Attorney, Agent, or Firm* — Bushman Werner, P.C.

(57) ABSTRACT

A system and method for determining when a sand separator should be purged to remove solids from the sand separator. The system can include an acoustic sensor which detects the frequency of audible sound coming from the inner chamber of the vessel and generate a signature signal representative of the frequency of audible sound. There is a processor connected to the acoustic sensor and configured to compare the signature signal with a set frequency range of audible sound which in turn generates a signal indicating when the signature frequency and the set frequency are in overlapping relationship.

12 Claims, 1 Drawing Sheet

(51) Int. Cl.
    *G01F 11/40*     (2006.01)
    *G01F 11/34*     (2006.01)
    *G01F 11/46*     (2006.01)

(56) References Cited

U.S. PATENT DOCUMENTS

| | | |
|---|---|---|
| 9,803,459 B1 | 10/2017 | Leal |
| 2002/0189358 A1* | 12/2002 | Frank .................... G01N 29/14 |
| | | 73/587 |
| 2014/0345727 A1 | 11/2014 | Gilmore et al. |
| 2019/0118118 A1 | 4/2019 | Sehsah et al. |
| 2021/0077923 A1 | 3/2021 | Carlson et al. |
| 2021/0252431 A1 | 8/2021 | Malone et al. |

FOREIGN PATENT DOCUMENTS

| | | | | |
|---|---|---|---|---|
| EP | 0317322 A2 * | 5/1989 | ............. | G01N 29/24 |
| EP | 0385789 A2 * | 3/1990 | ............. | G01N 29/14 |

\* cited by examiner

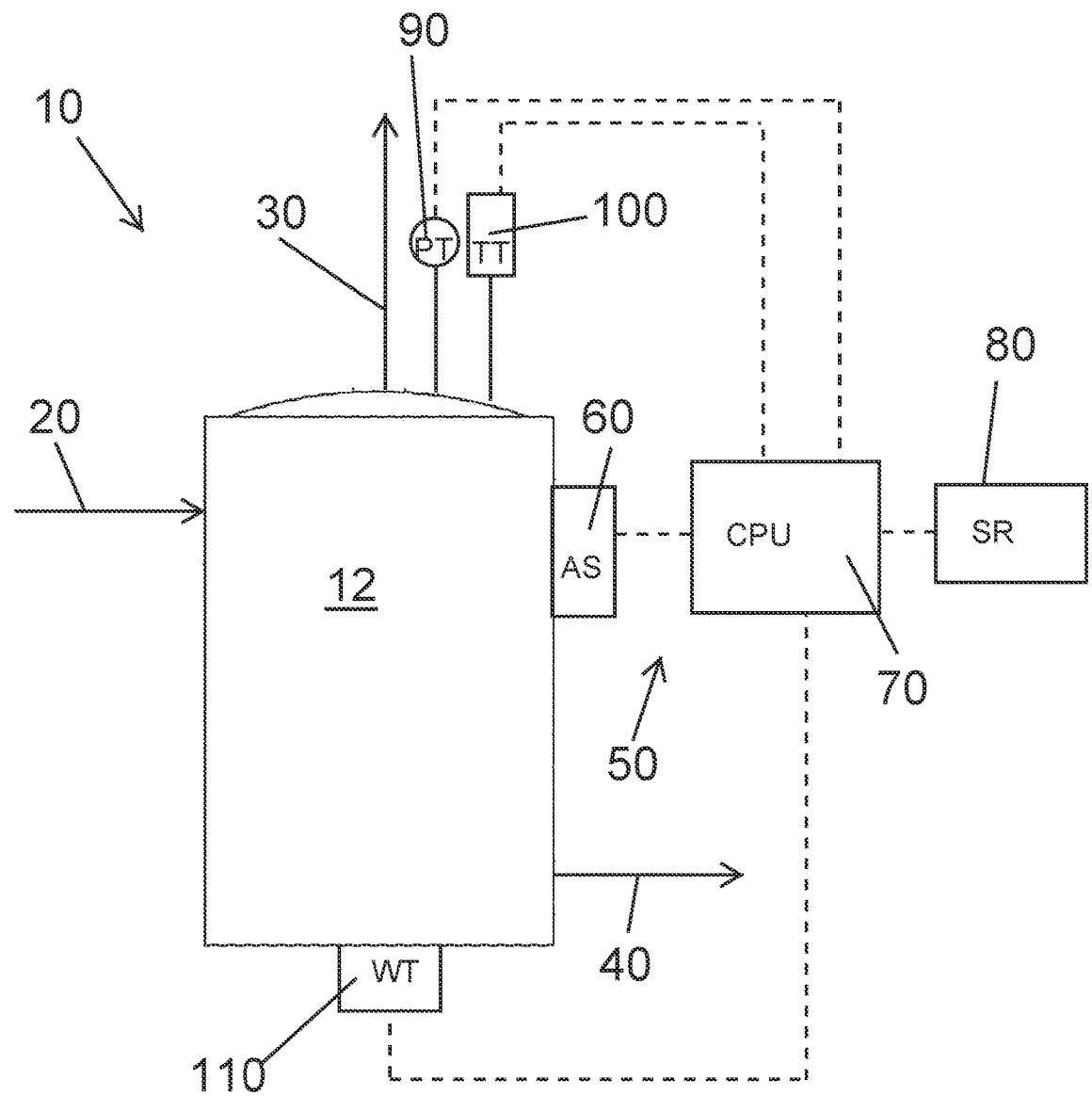

APPARATUS AND METHOD FOR DETERMINING SOLIDS LEVEL IN A SAND SEPARATOR

CROSS REFERENCE TO RELATED APPLICATION

This application claims priority to U.S. application Ser. No. 63/123,811 filed on Dec. 10, 2020 the disclosure of which is incorporated herein by reference for all purposes.

FIELD OF THE INVENTION

The invention relates to an apparatus and method for determining the level of solids in a sand separator used in the recovery of gaseous hydrocarbons such as natural gas.

BACKGROUND OF THE INVENTION

Recovering natural gas is rarely a straightforward proposition. To begin with, the gas may not readily flow from the reservoir/formation into the wellbore due to a variety of factors including formation characteristics and pressures. Accordingly, and as is well known in the art, to increase gas flow and recovery, many methods are employed to increase natural gas production including horizontal drilling and hydraulic fracturing, commonly referred to as "fracking". Fracking involves pumping high pressure fluid and sand into the reservoir to fracture the rock in the formation in order to open and prop up the formation. After fracking, the sand remains in the fractures/fissures to create a high permeability flow path toward the well.

While horizontal drilling and fracking are effective at increasing the recovery of hydrocarbons, they create additional challenges. In the process, large quantities of fluid, sand, and other additives are introduced into the formation. After fracking, the introduced fracking sand and naturally occurring reservoir fines or sand are produced back into the well along with any remaining fluids, natural gas, and reservoir fluids. Solids/sand particulates produced to the surface can cause plugging and/or erosion of surface equipment and pipelines.

To remove sand from the natural gas production stream at the surface, sand separators are used. Typically a sand separator comprises a vessel with an inlet port, and a gas outlet port on the upper part of the vessel, and a drain at the bottom of the vessel. Accumulated solids, water, and some gas is periodically discharged from the drain when it is determined that the solids in the sand separator has reached a certain level.

One common way of determining when the sand separator should be purged through the drain is based on a worker's familiarity with the internal sound profile in the sand separator. Through experience, when the sound profile has certain characteristics, e.g., a certain frequency, the worker, knows that it is in a dump mode.

SUMMARY OF THE INVENTION

In one aspect, the present invention relates to an apparatus for determining the solids level in a vessel used in a sand separation process.

In another aspect, the present invention relates to a method for determining the solids level in a vessel used in a sand separation system.

In still another aspect the present invention relates to an acoustic apparatus and method for determining solids level in a sand separator.

These and further features and advantages of the present invention will become apparent from the following detailed description, wherein reference is made to the accompanying FIGURE.

BRIEF DESCRIPTION OF THE DRAWINGS

The single FIGURE is a schematic showing one embodiment of the present invention.

DETAILED DESCRIPTION OF PREFERRED EMBODIMENTS

A production stream from a natural gas well typically comprises gases, sand and other particulate matter, and liquids. In a natural gas recovery facility at a well site, the production stream is introduced into the sand separator with highly variable velocities determined by gas production volumes and pressures. The composition of the production stream is such that the gas is primarily a natural gas whereas the liquid and particulate phases are primarily water and sand. However, other solids/liquids may also be present. Production streams from recently fracked wells can have initial pressures ranging from 3,000-5,000 psi, and at times up to 10,000 psi. As such, flow rates, depending upon the size of the feed line to the sand separator can approach a million $ft^3$/hour or more, resulting in extremely high velocities entering the vessel. These high velocities coupled with the inherent internal turbulence in the sand separator create an audible sound profile which is specific to the particular well and the sand separator used thereon. Turning to the single FIGURE, a sand separator shown as 10, comprises a vessel 12 to which is connected a production stream line 20, a gas outlet conduit 30, and a drain conduit 40 for said sand/solids slurry. The system of the present invention, shown generally as 50 comprises an acoustic sensor 60 connected in audible sound transmitting relationship to vessel 12. The system 50 further comprises a processor 70 connected to the sensor 60 which in turn is operatively connected to a signal receiver 80 which can be an alarm, a readout, etc. Acoustic sensor 60 can be an accelerometer such as a Monitran MTN/1100IC accelerometer During operation, liquids and solids, primarily sand but also other particulates build up in the vessel 12. At a predetermined level of the liquid/solid mixture in the vessel, the mixture is dumped through the outlet 40. As previously noted, conventionally, the point at which the liquid/solid mixture is dumped is determined by a worker familiar with the audible sound profile in the vessel 12 who knows that when the audible sound emanating from the vessel has certain characteristics, e.g., a certain range of frequencies, it is a sign that the liquid/solid mixture has reached a certain level and must then be dumped.

In operation, audio sensor 60 continuously transmits a signal to processor 70, the signal to processor 70 representing a sound characteristic, e.g., frequency or frequency range. Processor 70 is configured to generate and store an audio profile comprising a range of audio characteristics, e.g., frequencies, which brackets the particular sound characteristic, e.g., frequency or frequency range at which a dump would occur. When the signal from sensor 60 represents a sound characteristic, e.g., frequency/frequency range $(F_s)$, which falls within the range of the audio profile programmed into processor 70, processor 70 sends a signal to signal receiver 80 which in turn alerts, in a suitable fashion, a worker that the liquid/solids mixture in vessel 12 has reached a level at which it must be dumped.

For example, processor 70 can be configured to generate a sound profile based on a frequency range of $F_1$ to $F_2$, $F_1$ being a lower frequency than $F_2$. Processor 70 would also be configured to compare the profile $F_1$-$F_2$ with $F_s$. When the signal from sensor 60 to processor 70 reflects a frequency or range thereof ($F_s$) which overlaps the range $F_1$ to $F_2$, processor 70 sends a signal to signal receiver 80 that vessel 12 should be dumped.

There are several ways to calibrate the system of the present invention and to program processor 70 with a working audio profile $F_1$-$F_2$. In one method, the audio output from the sensor 60 can be obtained at various fill levels in vessel 12 beginning with vessel 12 being empty to being filled to the dump point or above. Knowing from previous experience on that particular well/vessel combination when the dump frequency $F_s$ is reached, processor 70 can be configured to generate a range of operating frequencies $F_1$-$F_2$ which bracket the frequency $F_s$. In another method, and in the case of a currently operating sand separator, the frequency at which a worker would dump through the drain of the vessel can be determined to establish $F_s$. The profile range $F_1$-$F_2$ which includes a frequency range overlapping $F_s$ can then form the basis for the audio profile necessary for the system of the present invention to signal subsequent dump cycles.

The system of the present invention can also include a pressure transducer 90 connected to vessel 12 so as to determine the internal pressure of vessel 12.

Further, a temperature transducer 100 can also be connected in temperature measuring relationship to vessel 12 to determine the internal temperature.

Lastly, the system can include a weight transducer 110 to sense and display the weight of the vessel plus the contents. The weight transducer can include a suitable load cell and in a preferred embodiment, the weight transducer would be intrinsically safe because of the potentially explosive conditions around and oil/gas well. In one embodiment, the load cell can be of the pneumatic and/or hydraulic type or can in fact be other types of load cells well known to those skilled in the art.

As seen in the FIGURE, the temperature, pressure, and weight transducers are all operatively connected to the controller 70 whereby the data from those transducers can be transferred, e.g., to signal receiver 80.

In a more sophisticated version of the present invention, an appropriate algorithm which characterizes the audible sound profile from the vessel, including when the profile includes a dump frequency can be employed. It should also be understood that although in the incipient stages, the system would be on a specific sand separator operating on a specific well, over time, and using artificial intelligence (A.I.), sufficient data can be accumulated such that the system can be used on other separators and other wells, the A.I. generated algorithm providing the audio profile $F_1$-$F_2$. As well, the temperature, pressure, and weight data could be incorporated into the algorithm to give a more complete profile in the vessel. Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of monitoring unknown solids content in a sand separator, said sand separator comprising a vessel having an inlet, a gas outlet, and a drain, comprising;
   providing a sand separator comprising a vessel with a known amount of solids in said vessel;
   providing an acoustic sensor in contact with said vessel and in sound transmitting relationship to said vessel to detect audible sound frequencies in the interior of said vessel caused by internal turbulence in said vessel resulting from the introduction into the vessel of a high velocity stream of production fluid comprising liquids and solids;
   generating a signature signal with said acoustic sensor representative of said solids level in said vessel with said known amount of solids;
   transmitting said signature signal to a processor;
   generating a first signal representative of audible sound frequencies in said vessel below the frequency of said signature signal;
   transmitting said first signal to said processor;
   generating a second signal representative of audible sound frequencies in said vessel above the frequency of said signature signal;
   transmitting said second signal to said processor;
   said processor being configured to generate an audible sound frequency profile for said vessel ranging from said first signal frequency to said second signal frequency;
   providing said vessel with an unknown amount of solids in said vessel;
   generating a third signal representative of audible sound frequencies in said vessel with said unknown amount of solids;
   comparing the frequencies of said third signal with said profile; and
   indicating when said frequencies of said third signal are within the range of said profile; and
   opening said drain when said frequencies of said third signal are within the range of said profile.

2. The method of claim 1, further comprising:
   providing a weight transducer positioned with respect to said vessel to provide an output signal indicative of the weight of said vessel and contents therein.

3. The method of claim 2, wherein said weight transducer comprises a load cell.

4. The method of claim 1, further comprising:
   providing a temperature transducer configured to measure the temperature in said vessel.

5. The method of claim 1, further comprising:
   providing a pressure transducer configured to measure pressure in said vessel.

6. The method of claim 1, wherein said acoustic sensor is an accelerometer.

7. A method of monitoring the amount of solids content in a sand separator, said sand separator comprising a vessel having an inlet, a gas outlet, and a drain, comprising;
   providing a sand separator comprising a vessel with a known amount of solids in said vessel;
   providing an acoustic sensor in contact with said vessel and in sound transmitting relationship to said vessel to detect audible sound frequencies in the interior of said vessel resulting from the introduction into the vessel of a high velocity stream of production fluid comprising liquids and solids;

generating a signature signal with said acoustic sensor representative of said solids level in said vessel with said known amount of solids;

transmitting said signature signal to a processor;

said processor being configured to generate an audible sound frequency profile for the interior of said vessel using said signature signal and a desired range of frequencies above and below the frequency of said signature signal;

providing said vessel with an unknown amount of solids in said vessel;

generating a signal representative of audible sound frequencies in said vessel with said unknown amount of solids;

comparing the frequency of said signal with said sound frequency profile;

indicating when said frequency of said signal is within the range of said profile; and opening said drain when said frequency of said signal is within the range of said profile.

8. The method of claim 7, wherein said weight transducer comprises a load cell.

9. The method of claim 8, wherein said weight transducer comprises a load cell.

10. The method of claim 7, further comprising:

providing a temperature transducer configured to measure the temperature in said vessel.

11. The method of claim 7, further comprising:

providing a pressure transducer configured to measure pressure in said vessel.

12. The method of claim 7, wherein said acoustic sensor is an accelerometer.

* * * * *

UNITED STATES PATENT AND TRADEMARK OFFICE
CERTIFICATE OF CORRECTION

PATENT NO. : 11,656,203 B2
APPLICATION NO. : 17/544323
DATED : May 23, 2023
INVENTOR(S) : Jason Pitcher It is certified that error appears in the above-identified patent and that said Letters Patent is hereby corrected as shown below:

In the Claims

At Column 6, Line 5, please replace Claim 8 with the following:
--8. The method of claim 7, further comprising: providing a weight transducer positioned with respect to said vessel to provide an output signal indicative of the weight of said vessel and contents therein.--

Signed and Sealed this
First Day of July, 2025

Coke Morgan Stewart
*Acting Director of the United States Patent and Trademark Office*